United States Patent [19]

Sliz et al.

[11] 4,063,345

[45] Dec. 20, 1977

[54] METHOD AND APPARATUS FOR RFI BAND REPLACEMENT

[75] Inventors: Edward Sliz; John O. Brooks, both of Huntsville; Howard M. Gibson, Union Grove, all of Ala.

[73] Assignee: The United States of America as represented by the Secretary of the Army, Washington, D.C.

[21] Appl. No.: 752,352

[22] Filed: Dec. 20, 1976

[51] Int. Cl.[2] .................... B21D 39/00; B23P 11/02

[52] U.S. Cl. .................... 29/522 A; 29/629; 29/747; 29/243.53; 29/526 A

[58] Field of Search .................... 29/243.53, 243.55, 509, 29/522, 522 R, 629, 526, 747, 751

[56] References Cited

U.S. PATENT DOCUMENTS

| | | | |
|---|---|---|---|
| 622,251 | 4/1899 | Moore | 29/243.55 |
| 791,330 | 5/1905 | Dodge | 29/522 UX |
| 1,955,302 | 4/1934 | Leister | 29/243.55 X |
| 3,570,554 | 3/1971 | Kabel | 29/522 X |
| 3,702,085 | 11/1972 | Hicok | 29/522 X |
| 3,828,421 | 8/1974 | Erlichman | 29/522 |

*Primary Examiner*—Charlie T. Moon
*Attorney, Agent, or Firm*—Nathan Edelberg; Robert P. Gibson; Harold W. Hilton

[57] ABSTRACT

Apparatus for replacing RFI bands on electric cable connectors used in missile systems. The apparatus permits RFI band replacement in the field and includes a jig for support of the connector therein while rivet holes are drilled in the connector. An RFI band is placed around the connector and the band and connector is placed in the jig. The jig includes means for snugly engaging the RFI band around the connector. The jig includes access means through which tools are inserted to align the RFI band to the desired location, to place a rivet through openings in the band, and, to secure the rivet for secured relation of the band around the connector.

5 Claims, 7 Drawing Figures

METHOD AND APPARATUS FOR RFI BAND REPLACEMENT

BACKGROUND OF THE INVENTION

Electric cable connectors used in missile systems are provided with an RFI band around the inner (female) connector for snugly engaging the inner surface of the outer cable connector responsive to assembly of the cable connectors to prevent RF energy from entering the cable.

Once the missile has been placed in the field and a band failure was found to have occured, the combersome cable was shipped to a depot for repair. This necessitated that the missile be inactivated until which time the cable was repaired and received back in the field. Apparatus of the present invention permits rapid and facile replacement of the assembly in the field, this, virtually eliminating "down time" of the missile due to RFI band replacement.

SUMMARY OF THE INVENTION

Apparatus for replacing RFI bands in missile cable connectors in the field. The apparatus includes a jig having a central opening having recesses to mate with protrusions on the connector member. With the connector in the jigs, rivet holes are drilled in the connector at predetermined locations. The jig is opened, the connector removed and an RFI band is placed around the connector member. The jig is secured around the connector member and the band. The jig includes an opening in the upper portion thereof which a tool is inserted to align the RFI band with one of the two holes drilled in the connector. The holes are positioned behind aligning keys on the connector and spaced approximately 120° apart. The jig is provided with matching spaced grooves to receive the pins therein. A rivet is positioned in the desired hole through a groove provided at the front of the jig. The groove communicates with the central and upper opening. A rivet header engages the rivet through the upper opening and a hammer is used to strike the header to set the rivet.

DESCRIPTION OF THE PREFERRED EMBODIMENT

Figure 1:
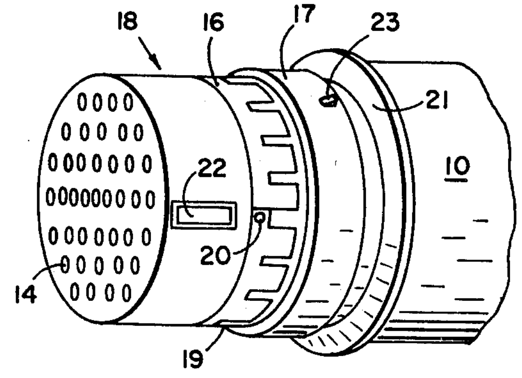
FIG. 1 is a pictorial view of the connector having the RFI band assembled thereon.

As seen in FIG. 1 a female cable connector member 10 includes a body having a plurality of openings 14 therein to receive pins from the male connector member (not shown). An RFI band 16 is shown assembled around the forward portion 18 of the connector by a rivet 20. A plurality of guide ridges 22 (or keys) are provided on the forward portion 18 and spaced about 120° apart. A raised annular portion 17 and a portion 19 of smaller diameter is provided on the connector. An aligning key 23 is disposed on annular portion 17.

Figure 2:
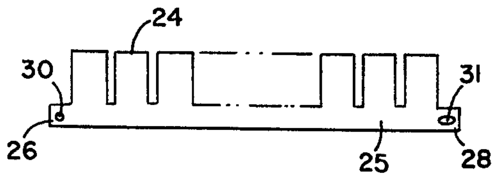
FIG. 2 is an elevational view of the RFI band.

The RFI band (FIG. 2) includes a flat band portion 25 and an upper portion comprised of a plurality of extending fingers 24. Ends 26 and 28 are respectively provided with a circular hole 30 and elongated hole 31.

Figure 3:
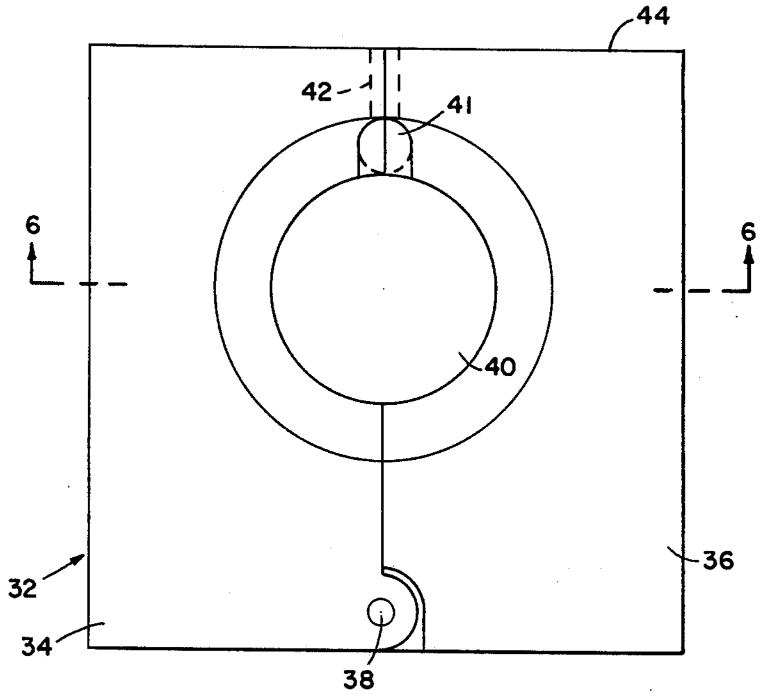
FIG. 3 is a front elevational view of the jig used in assembling the RFI band to the connector body.
Figure 4:
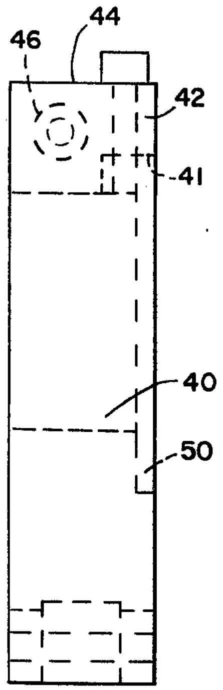
FIG. 4 is a side elevational view of the jig of FIG. 3.
Figure 5:
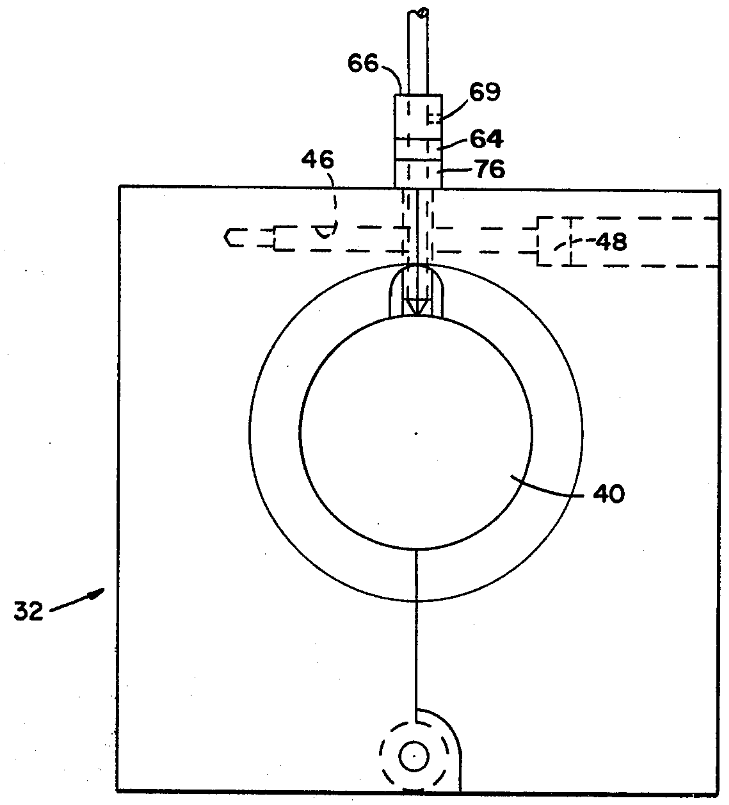
FIG. 5 is a rear elevational view of the jig of FIG. 3 and showing tools used in the drilling operation.

As seen in FIG. 3, the jig assembly used in assembling the band to the connector includes a body 32 comprised of a pair of sections 34 and 36 pivotly secured together at 38. A central opening 40 is provided through the body. A groove 41 is provided in the body in communication with the central opening. Groove 41 (FIG. 4) extends through the body and communicates with a second opening 42 which opens through the top 44 of the body. The body includes a tapped opening 46 to receive a socket head screw 48 therein (FIG. 5).

Figure 6:
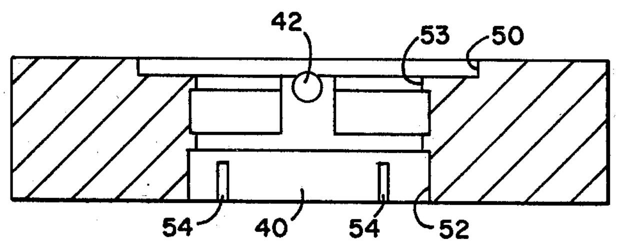
FIG. 6 is a sectional view along line 6—6 of FIG. 3.

As seen in FIG. 6 the central opening 40 in the body includes a larger diameter portion 50, an intermediate diameter portion 52 and a smaller diameter portion 53. A plurality of keyways 54 (only two shown) is provided in the body and are spaced approximately 120°.

Figure 7:
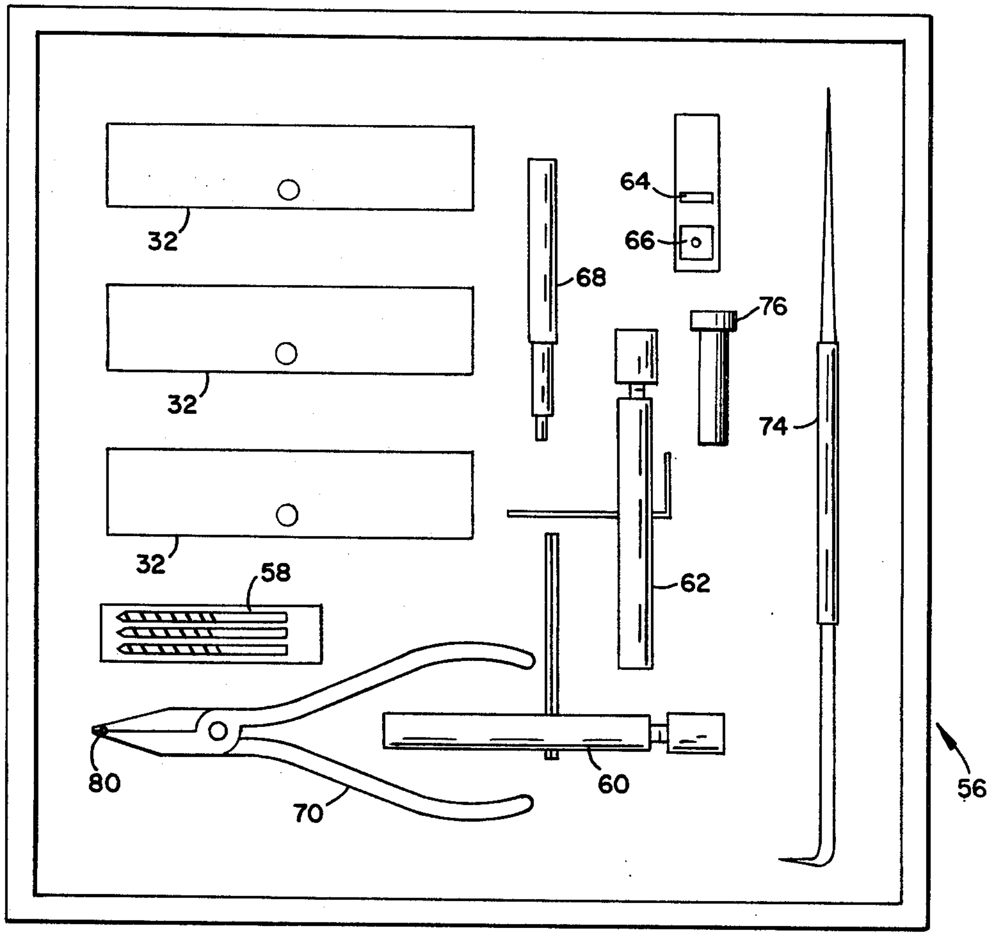
FIG. 7 is a plan view of a tool kit illustrating the tools used in assembly of the RFI band.

As seen in FIG. 7 a tool kit 56 is provided to assemble the band to the connector. The tool kit contains three jigs. Jigs 32 are shown to accomodate the three different size connectors usually used in the missile's cable assemblies. Drill bits 58 are provided for each different jig body. A pair of tap wrenches 60 and 62 of different sizes are also provided. The kit further includes a gage 64, a drill stop 66, a rivet header 68, a pair of pliers 70 having an opening 80 through the times thereof, a scribe 74, and a drill bushing 76.

Before the band can be installed on the connector a hole must be drilled in the desired location of the connector body. This is done by pivoting the jig body sections 34 and 36 about pivot 38 and inserting the connector in the central opening 40. The connector is snugly retained in the jig by turning socket head screw 48 with the tap wrench 60 (FIG. 7).

The connector is positioned in the central opening 40 with raised portion 17 engaging portion 53 and portion 21 engaging portion 52 of body 32. Aligning key 23 is aligned in one of the keyways 54 so that each rivet hole is approximately 120° clockwise and counter clockwise from the installation of the original rivet. This assures that the rivet will be directly behind one of the keys 22 on the connector.

Drill bushing 76 is inserted in upper opening 42 (FIG. 5) and drill bit 58 is inserted through the bushing so that the tip of the bit engages the connector body. A gage 64 and a drill stop 66 is positioned around the drill bit (FIG. 5) and on top of the drill bushing. The drill stop 66 is secured to the drill bit by a set screw 69 using wrench 62 (FIG. 7). The drill bit and gage is then removed and the drill bit placed in a hand drill so that the drill stop 66 engages the chuck. The gage is of a thickness to assure that when the body is drilled, the bit will not go completely through the body. The bit is inserted through the opening in the drill bushing and the hole is drilled in the body to the desired depth.

To assemble the band to the connector, body members 34 and 36 are pivoted open, the drilling tools removed, and the connector with the band therearound is positioned back in the central opening. Members 34 and 36 are snugged by turning socket head screw 48.

In this position keys 23 are in keyways 54 of the jig and the hole in the connector body is in alignment with opening 42. If opening 30 and 31 of the band are not aligned with the hole in the connector body, scribe 74 (FIG. 7) is inserted through upper opening 42 of body 32, opening 30 and 31 of the band and the hole in the connector for alignment. The body members 34 and 36 are then snugly secured by member 48.

A rivet 20 (FIG. 1) is placed in an opening 80 (FIG. 7) of pliers 70 and the pliers are inserted in groove 41 to place the rivet in the openings of the band and in the hole in the connector. A rivet header 68 (FIG. 7) is placed in opening 42 and in engagement with the rivet. A hammer is used to secure the rivet to the connector.

We claim:

1. Apparatus for assembling an RFI band on a cable connector comprising:

a. a body including a pair of members pivotly secured together and provided with a central opening to receive said band in circumferential relation with said connector;

b. said body having an upper opening transversely to said central opening and a groove in communication with said central opening and said upper opening, whereby responsive to receiving said connector in said central opening operating means is inserted through said upper opening and said groove for secured relation of said band on said connector, and c. operating means inserted through said upper opening for upsetting a rivet inserted into alignment with said upper opening through said groove.

2. Apparatus as in claim 1 wherein said body is provided with means for securing said members about said connector and said band prior to securing said band to said connector.

3. Apparatus as in claim 2 wherein said central opening includes a plurality of surfaces having different diameters to match different diameters on said connector.

4. Apparatus as in claim 3 with said central opening having keyways therein spaced approximately 120° apart.

5. A method of assembling an RFI band having openings on the ends thereof on a cable connector having an opening therein, in a jig having a pair of members pivotally secured together and provided with a central opening, an upper opening and a groove communicating with said central and upper opening comprising the steps of:

a. loosely wrapping said band about said connector;

b. inserting said connector and said band in said central opening;

c. aligning said openings on the ends of said band with the opening in said cable connector and the central opening in the jig;

d. inserting a rivet in said opening in said cable connector through said groove in said body, e. inserting a rivet setter in said upper opening in engagement with said rivet; and, f. striking said rivet to upset said rivet for securing said band to said cable connector.

* * * * *